United States Patent [19]

Reed, Sr.

[11] Patent Number: 5,238,585
[45] Date of Patent: Aug. 24, 1993

[54] SPA CLEANING APPARATUS

[76] Inventor: Douglas D. Reed, Sr., 6220 Shallowford Rd. #150, Chattanooga, Tenn. 37421

[21] Appl. No.: 966,724

[22] Filed: Oct. 26, 1992

[51] Int. Cl.⁵ .................................................. B01D 35/00
[52] U.S. Cl. .................................... 210/805; 210/169; 4/490; 15/1.7; 15/409
[58] Field of Search .................... 210/169, 416.2, 805; 4/490, 492; 15/1.7, 409

[56] References Cited

U.S. PATENT DOCUMENTS

| | | | |
|---|---|---|---|
| 3,348,686 | 10/1967 | Spitzer | 210/169 |
| 3,932,281 | 1/1976 | Pansini | 210/169 |
| 4,057,372 | 11/1977 | Johnson et al. | 210/169 |
| 4,240,173 | 12/1980 | Sherrill | 15/409 |
| 4,443,899 | 4/1984 | Johnson | 4/490 |
| 4,501,659 | 2/1985 | Henk | 210/169 |
| 4,797,206 | 1/1989 | Lynch | 210/169 |
| 4,818,389 | 4/1989 | Tobins et al. | 210/169 |
| 4,826,591 | 5/1989 | Macia | 210/169 |
| 4,944,101 | 7/1990 | Goble | 15/1.7 |
| 5,135,647 | 8/1992 | Childers | 210/169 |

Primary Examiner—Peter Hruskoci
Assistant Examiner—Robert James Popoves
Attorney, Agent, or Firm—Alan Ruderman

[57] ABSTRACT

A debris cleaning accessory for a spa tub having high pressure water jets directed into the tub includes an adapter selectively attachable to one of the spa jets to supply water into a conduit. A nozzle disposed in the conduit has an inlet communicating with the adapter and an outlet which opens into a passageway between the adapter and the outlet of the conduit. Another passageway communicates with the conduit at the location of the nozzle outlet. A hose has an outlet which communicates with the second passageway and an inlet which may be placed in the water within the spa tub. A mesh filter bag is attached to the outlet of the conduit and collects debris received from the hose while filtered water passes through the bag back into the spa tub.

6 Claims, 1 Drawing Sheet

SPA CLEANING APPARATUS

BACKGROUND OF THE INVENTION

This invention relates to apparatus for cleaning debris from the water of a spa and more particularly to such apparatus which is readily attachable to a supply nozzle port of a spa and uses the circulating water emitted from the supply nozzle to create a vacuum and draw water and debris from the spa into a filter bag, the debris being collected in the bag while the water exits.

Spa tubs in which high velocity jets of heated aerated water enter through nozzles in the side walls of the tub to provide a stress reducing massaging action to the occupants are very popular because of the relaxing effects provided. As in in any tub fine particles of grit tend to accumulate and the tub should be cleaned periodically. However, unless the spa has an expensive elaborate built-in cleaning system, the tub must be emptied of water in order to remove fine debris which has accumulated. The spa filtration system and cleaning systems of most tubs having such systems are effective for removing debris such as leaves, but generally are ineffective for removal of fine materials such as sand, dirt and flakes. In known cleaning systems in which a vacuum action is used to suction water and debris from the tub through a hose and then through a filter, the filtered water thereafter is drawn to the inlet of a jet nozzle of the spa. They are therefore similar to swimming pool leaf skimmers. Johnson U.S. Pat. Nos. 4,057,372 and 4,443,899 illustrate such systems for spas while Henk U.S. Pat. No. 4,501,659; Macia U.S. Pat. No. 4,826,591 Tobias et al U.S. Pat. No. 4,818,389 illustrate swimming pool leaf skimmers. All of these systems use a venturi connected to the inlet side of the jet nozzle. Thus, unless a filter is placed before the nozzle, clogging of the nozzle may result. The debris filtration system must therefore be built into the spa or pool rather than being a relatively inexpensive accessory attachable to the spa plumbing when desired. In Pansini U.S. Pat. No. 3,932,281 there is illustrated a selectively usable leaf removal accessory which is fitted over the leaf trap in the floor of a swimming pool, the device having a ring through which water is pumped to create jets within the device for drawing leaves from the trap into a filter bag.

SUMMARY OF THE INVENTION

Consequently, it is a primary object of the present invention to provide an accessory for a spa tub which may be connected to an outlet jet of the spa for cleaning debris from the spa.

It is another object of the present invention to provide a simple inexpensive accessory for a spa tub which is attachable to a supply jet of the spa for drawing debris from the spa tub through a hose and into a filter bag downstream of the jet.

It is a further object of the present invention to provide an accessory for a spa tub which is selectively attachable to an outlet jet port of the spa for drawing fine debris through a hose and into a filter bag, the accessory including a venturi device using the high velocity jet to create a low pressure for drawing water and debris through the hose.

Accordingly, the present invention provides a debris cleaning accessory for a spa tub which uses the supply water from a spa jet to drive a venturi device to clean the water in the spa. An adaptor is selectively attachable to the existing spa jet to supply water under high pressure into a conduit leading to a nozzle, the nozzle opening into a passageway with which a second conduit communicates, the second conduit being connected to a hose. The supply water jet exiting the nozzle creates a low pressure zone for the passageway to draw water and debris through the hose into the passageway. A mesh filter bag is attached to the outlet of the passageway and collects the debris while the filtered water passes through the bag back into the spa tub.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 1:
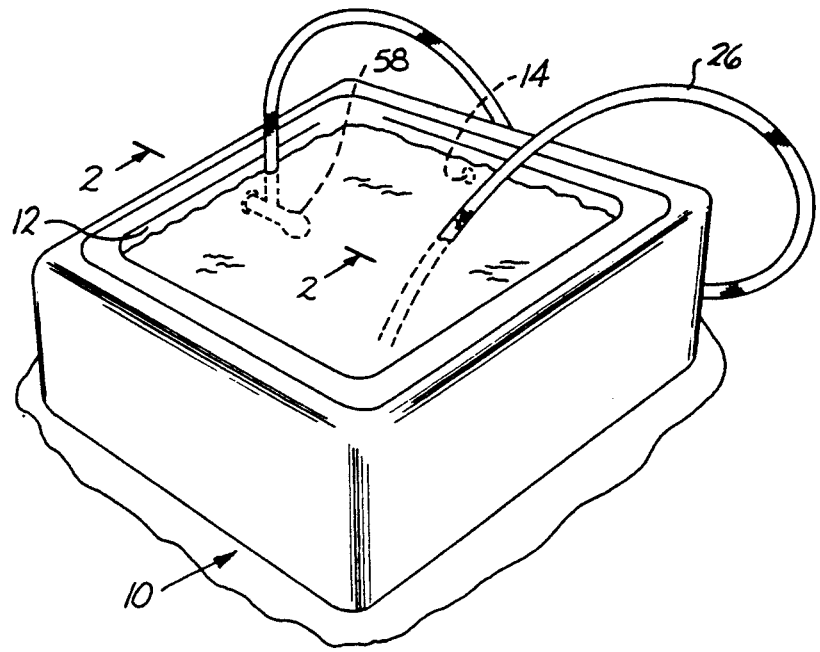
FIG. 1 is a perspective view depicting a spa tub having mounted therein a debris cleaning accessory constructed in accordance with the principles of the present invention.
Figure 2:
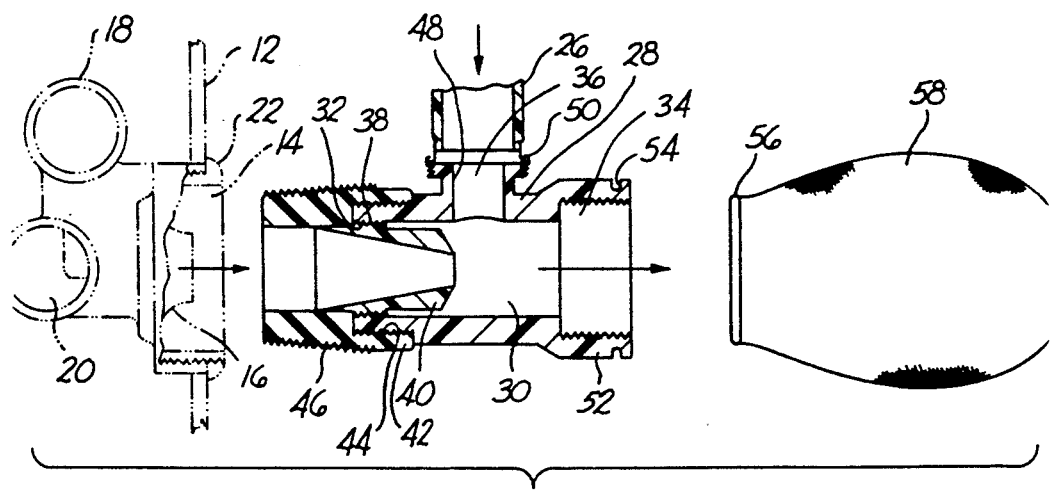
FIG. 2 is a cross sectional view taken substantially along line 2—2 of FIG. 1.

Referring now to the drawings, FIG. 1 depicts a spa tub 10 having side walls 12 in which jet outlet ports 14 are mounted. Conventionally, each outlet includes a nozzle 16 through which water and air are directed by respective conduits 18, 20, the water being aerated by the air as it enters the spa tub as a high velocity jet. A face plate 22 or the like having external threads about a hub portion 23 may threadily be received within the port about the nozzle 16.

In accordance with the present invention a debris cleaning accessory 24 having a flexible hose 26 is provided which may be mounted within the port selectively and receive the high velocity jet from the nozzle 16, the velocity of the jet being increased and acting to create a low pressure within the hose to draw water and debris through the hose. The cleaning accessory includes a body member 28 preferably molded from PVC or similar synthetic plastic material in the form a a T-shape fitting, the body member having a first passageway 30 including an inlet 32, and an outlet 34 in substantial alignment with the inlet 32, and a second passageway 36 opening into and being substantially perpendicular to the first passageway 30. Secured as by threads 38 within the first passageway 30 and having an outlet end extending into the path of the second passageway 30 is a converging nozzle 40 which also may be formed from PVC or the like, the inlet end of the nozzle extending externally of the body member 28. The disposition of the outlet end or mouth of the nozzle relative to the passageway 36 and the converging interior configuration of the nozzle creates a venturi restriction such that water flowing at high velocity through the nozzle creates a vacuum or suction in the passageway 36.

An annular adapter 42 constructed from neoprene or similar hard rubber-like sealant material is threadedly connected at one end 44 about the inlet end of the body member 28 externally of the nozzle 40, the adapter 42 having a threaded exterior surface 46 preferably having a slight tapered configuration so as to be receivable within the interior of the face plate 22 when cleaning of the spa is desired, the tapered and threaded configuration forming a wedge connection and thus a tight seal with the interior wall of the face plate 22. Moreover, the exterior surface of the inlet end of the nozzle which extends out of the body member abuts the interior of the adapter 42 to provide a tight seal therebetween. Thus, substantially the entire jet of water flowing through the spa nozzle 16 of the port 14 is directed through the venturi nozzle 40 into the passageway 30.

Connected, for example, by threaded means about the annular wall 48 defining the second passageway 36 is a hose fitting 50 to which the hose 26 is crimped or otherwise fastened. In addition, the outlet 34 is formed within an annular hub 52 which may have a circumferential groove 54 formed in the exterior surface thereof, the groove being adapted to receive a resilient annular seal 56, such as neoprene, formed about the opening of a fine netting or mesh filter bag 58 constructed for example, from an open texture fabric through which water may flow but which will capture and collect fine debris such as sand and the like. Alternatively, the filter bag may have an externally threaded ring for connecting to threads within the interior of the hub 52.

When cleaning of the spa tub is desired, the adapter 42 is wedged into the interior of the face plate 22 by a rotational pushing action. The high velocity jet flowing through the spa nozzle 16 is thus directed into the inlet of the nozzle 40 of the cleaning accessory and is directed by the nozzle 40 into the passageway 30, the velocity of the jet being increased as it flows through the nozzle. As this high velocity jet flows past the outlet of the second passageway 36, the venturi effect creates a vacuum at the outlet of the passageway 36 resulting in water and debris being drawn through the hose 26. The water from the nozzle and the water and debris from the hose egress through the passageway 30 through the outlet 34 into the filter bag 58. While the debris accumulates in the filter bag 58, the water passes through and enters into the spa tub. After the spa has been cleaned, the adapter 42 is removed from the face plate 22. Thus, a very simple, inexpensive cleaning accessory is provided by the present invention which may be used whenever desired to clean the spa tub and effects a cleaning without the debris being directed through the spa ports.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. An accessory for cleaning debris out of the water within a spa tub having a pressurized water jet supply port in a wall thereof, said accessory comprising a body member having a first passageway including an inlet and an outlet, a nozzle disposed in said passageway having an outlet mouth disposed intermediate said inlet and said outlet for forming a restriction in said passageway to produce a high velocity, low pressure zone intermediate said inlet and said outlet, a second passageway disposed angularly relative to said first passageway and opening in said zone, a hose having one end communicating with said second passageway and a second end adapted to be positioned within the water in said spa tub, a mesh filter bag having an open texture permitting water to flow therethrough while trapping and collecting debris, means for attaching said bag to said body member in communication with said outlet for receiving water and debris flowing therethrough, and connecting means for selectively fastening said body member to said spa with said inlet in communication with said port for communicating water from said port to said nozzle, whereby water and debris flows from said spa tub through said hose to said low pressure zone and into said bag.

2. An accessory as recited in claim 1, wherein said connecting means comprises an adapter fastened to said body member about said inlet, and means for fastening said adapter within said port.

3. An accessory as recited in claim 1, wherein said second passageway is disposed substantially perpendicular to said first passageway.

4. An accessory as recited in claim 2, wherein said nozzle is fastened within said body member, said nozzle including an inlet mouth and a flow path converging from said inlet mouth to said outlet mouth, said adapter including means in sealing engagement about said inlet mouth.

5. An accessory as recited in claim 4, wherein said second passageway is disposed substantially perpendicular to said first passageway.

6. A method for cleaning debris from water within a spa tub having a port through which a high pressure water jet is supplied into the tub, said method comprising:
(a) communicating one end of a conduit with said port to receive said jet, said conduit having an outlet at another end and a passageway opening intermediate said ends;
(b) increasing the velocity of the jet within said conduit adjacent said passageway;
(c) communicating one end of a hose with said passageway;
(d) communicating the other end of said hose with the water within said tub; and
(e) communicating the outlet of said conduit with a mesh filter bag for trapping said debris within said bag while permitting water to flow through said bag into said tub.

* * * * *